(12) United States Patent
Dayal

(10) Patent No.: US 10,037,712 B2
(45) Date of Patent: Jul. 31, 2018

(54) VISION-ASSIST DEVICES AND METHODS OF DETECTING A CLASSIFICATION OF AN OBJECT

(71) Applicant: Toyota Motor Engineering & Manufacturing North America, Inc., Erlanger, KY (US)

(72) Inventor: Rajiv Dayal, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 354 days.

(21) Appl. No.: 14/609,874

(22) Filed: Jan. 30, 2015

(65) Prior Publication Data

US 2016/0225286 A1    Aug. 4, 2016

(51) Int. Cl.
*G09B 21/00* (2006.01)
*H04N 5/225* (2006.01)
*G06K 9/00* (2006.01)

(52) U.S. Cl.
CPC ....... *G09B 21/006* (2013.01); *G06K 9/00671* (2013.01); *H04N 5/2252* (2013.01)

(58) Field of Classification Search
CPC . G09B 21/006; G06K 9/00671; H04N 5/2252
See application file for complete search history.

(56) References Cited

U.S. PATENT DOCUMENTS 5,774,841 A * 6/1998 Salazar ............... G10L 15/22
704/225

6,023,688 A * 2/2000 Ramachandran .... G06Q 20/042
705/40

(Continued)

FOREIGN PATENT DOCUMENTS

EP         2363251 A1    9/2011
WO      2012104626 A1   8/2012

OTHER PUBLICATIONS

Takayuki Kanda, et al: Who will be the customer? A social robot that anticipates people's behavior from their trajectories; UbiComp '08 Proceedings of the 10th International Conference of Ubiquitous Computing; ACM, Sep. 21, 2008, ISBN: 978-1-60558-136-1.

*Primary Examiner* — Sath V Perungavoor
*Assistant Examiner* — Philip Dang
(74) *Attorney, Agent, or Firm* — Dinsmore & Shohl LLP

(57) ABSTRACT

Vision-assist devices and methods are disclosed. In one embodiment, a vision-assist device includes an image sensor for generating image data corresponding to a scene, a processor, and an auditory device. The processor is programmed to receive the image data from the image sensor, perform object recognition on the image data to determine a classification of a detected object that is present within the scene, and determine a confidence value with respect to the classification of the detected object. The confidence value is based on a confidence that the classification of the detected object matches an actual classification of the detected object. The processor further generates an auditory signal based on the confidence value. The audio device receives the auditory signal from the processor and produces an auditory message from the auditory signal. The auditory message is indicative of the classification of the detected object and the confidence value.

21 Claims, 7 Drawing Sheets

(56) References Cited

U.S. PATENT DOCUMENTS

| | | |
|---|---|---|
| 6,542,809 B2 | 4/2003 | Hehls, III |
| 6,554,987 B1 | 4/2003 | Gilchrist et al. |
| 6,710,706 B1 | 3/2004 | Withington et al. |
| 7,336,226 B2 | 2/2008 | Jung et al. |
| 7,751,937 B2 | 7/2010 | Sabe et al. |
| 7,778,732 B2 | 8/2010 | Adachi et al. |
| 7,840,326 B1 | 11/2010 | Yamada |
| 8,063,929 B2* | 11/2011 | Kurtz .............. H04N 7/147 348/14.08 |
| 8,140,188 B2 | 3/2012 | Takemitsu et al. |
| 8,154,578 B2* | 4/2012 | Kurtz .............. G06K 9/00335 348/14.01 |
| 8,154,583 B2* | 4/2012 | Kurtz .............. H04N 7/147 348/14.01 |
| 8,159,519 B2* | 4/2012 | Kurtz .............. H04N 7/147 348/14.01 |
| 8,237,771 B2* | 8/2012 | Kurtz .............. G06K 9/00711 348/14.01 |
| 8,253,770 B2* | 8/2012 | Kurtz .............. H04N 7/142 348/14.01 |
| 8,274,544 B2* | 9/2012 | Kurtz .............. H04N 7/142 348/14.01 |
| 8,325,263 B2* | 12/2012 | Kato .............. G02B 27/017 345/8 |
| 8,438,127 B2 | 5/2013 | Kurata et al. |
| 8,442,714 B2 | 5/2013 | Matsukawa et al. |
| 8,467,133 B2* | 6/2013 | Miller .............. G02B 27/017 353/28 |
| 8,655,440 B2* | 2/2014 | Adachi .............. A61B 5/04845 381/60 |
| 8,660,734 B2 | 2/2014 | Zhu et al. |
| 8,676,937 B2* | 3/2014 | Rapaport .............. H04L 51/32 709/219 |
| 8,706,298 B2 | 4/2014 | Goulding |
| 8,775,341 B1* | 7/2014 | Commons .............. G06N 3/0454 706/20 |
| 8,825,488 B2 | 9/2014 | Scrobbins, II et al. |
| 8,849,391 B2* | 9/2014 | Adachi .............. A61B 5/04845 600/544 |
| 8,850,597 B1 | 9/2014 | Gates |
| 8,929,612 B2* | 1/2015 | Ambrus .............. G06K 9/00362 382/115 |
| 9,171,389 B2 | 10/2015 | Lee |
| 2005/0096839 A1 | 5/2005 | Nakano et al. |
| 2007/0153091 A1* | 7/2007 | Watlington .............. H04N 7/15 348/208.14 |
| 2007/0279494 A1* | 12/2007 | Aman .............. G01S 3/7864 348/169 |
| 2009/0190797 A1 | 7/2009 | McIntyre |
| 2011/0188664 A1* | 8/2011 | Morikawa .............. A61B 5/04845 381/60 |
| 2011/0238212 A1 | 9/2011 | Shirado et al. |
| 2012/0053826 A1 | 3/2012 | Slamka |
| 2012/0127291 A1 | 5/2012 | Mahoney |
| 2012/0143808 A1 | 6/2012 | Karins |
| 2012/0309407 A1 | 12/2012 | Cazier |
| 2013/0007662 A1 | 1/2013 | Bank |
| 2013/0029443 A1 | 1/2013 | Pance |
| 2013/0115579 A1 | 5/2013 | Taghavi |
| 2013/0127980 A1 | 5/2013 | Haddick |
| 2013/0170752 A1 | 7/2013 | Ramnath Krishnan et al. |
| 2013/0261796 A1 | 10/2013 | Park |
| 2013/0272548 A1* | 10/2013 | Visser .............. G06K 9/00624 381/122 |
| 2013/0326209 A1 | 12/2013 | Dommalapati |
| 2014/0019522 A1* | 1/2014 | Weng .............. G06F 17/30964 709/203 |
| 2014/0055229 A1 | 2/2014 | Amedi et al. |
| 2014/0057232 A1 | 2/2014 | Wetmore et al. |
| 2014/0101757 A1 | 4/2014 | Gnesda |
| 2014/0126877 A1* | 5/2014 | Crawford .............. G11B 27/105 386/200 |
| 2014/0160250 A1* | 6/2014 | Pomerantz .............. H04N 5/23229 348/47 |
| 2014/0161345 A1 | 6/2014 | Djugash |
| 2014/0184384 A1 | 7/2014 | Zhu et al. |
| 2014/0199041 A1* | 7/2014 | Blanco .............. G08B 13/19621 386/224 |
| 2014/0247206 A1 | 9/2014 | Grokop |
| 2015/0002808 A1 | 1/2015 | Rizzo, III et al. |
| 2015/0063713 A1 | 3/2015 | Yang et al. |
| 2015/0278224 A1 | 10/2015 | Jaber et al. |
| 2015/0358594 A1 | 12/2015 | Marshall |
| 2017/0153331 A1 | 6/2017 | Gum |

* cited by examiner

VISION-ASSIST DEVICES AND METHODS OF DETECTING A CLASSIFICATION OF AN OBJECT

TECHNICAL FIELD

The present specification generally relates to vision-assist devices, and more particularly, to vision-assist devices that provide auditory qualifying information regarding detected objects in an environment.

BACKGROUND

Blind or visually impaired persons have difficulty navigating within their environment because of their inability to detect the location and type of objects within the environment. Blind or visually impaired persons often use a cane to assist them in navigating a space. Although computer-based vision systems are able to detect objects present within image data, such vision systems are often incorrect in the type of object that is detected. If the computer-based vision system leads a person to believe that the object is one type of object, but it turns out that the object is something different, the person may no longer trust the information provided by the computer-based vision system. Therefore, such computer-based vision systems may be ineffective in assisting the blind and visually impaired because of a lack of trust regarding the information with respect to detected objects.

Accordingly, a need exists for alternative vision-assist devices for blind or visually impaired persons.

SUMMARY

In one embodiment, a vision-assist device includes at least one image sensor for generating image data corresponding to a scene, a processor, and an auditory device. The processor is programmed to receive the image data from the at least one image sensor, perform object recognition on the image data to determine a classification of a detected object that is present within the scene, and determine a confidence value with respect to the classification of the detected object. The confidence value is based on a confidence that the classification of the detected object matches an actual classification of the detected object. The processor is further programmed to generate an auditory signal based on the confidence value. The audio device receives the auditory signal from the processor and produces an auditory message from the auditory signal. The auditory message is indicative of the classification of the detected object and the confidence value.

In another embodiment, a method of detecting a classification of an object includes receiving image data of a scene from at least one image sensor, determining, by a processor and from the image data, a classification of a detected object that is present within the scene, and determining a confidence value with respect to the classification of the detected object. The confidence value is based on a confidence that the classification of the detected object matches an actual classification of the detected object. The method further includes producing an auditory message that is indicative of the classification of the detected object and the confidence value.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Referring generally to the figures, embodiments of the present disclosure are directed to vision-assist devices for assisting blind or visually impaired individuals navigate their environment. Generally, embodiments described herein may be configured as devices that capture image data of the user's environment using one or more image sensors (e.g., one or more cameras), and perform object recognition analysis to detect objects or people within the user's environment. Such information may be useful to the blind or visually impaired individual as he or she navigates the environment. Because object recognition analysis may not always yield 100% accurate results, the embodiments described herein produce an auditory message to the user of not only the type of object that is detected by the device, but also the degree of confidence that the type or classification of object determined by the device is actually the type or classification of the object physically present within the environment. In this manner, the user may decide for herself whether or not to trust or otherwise accept the auditory information provided by the vision-assist device.

As a non-limiting example, the vision-assist device may detect that a staircase is in front of the user, and may therefore produce an auditory message that says "I am 60% sure that a staircase is directly in front of you." As described in more detail below, the auditory message may also provide the object recognition information in more general terms of degree, such as: "I am fairly certain that a staircase is directly in front of you," or "I think that the staircase is in front of you, but I am not sure." The user may then decide to investigate the object further, disregard the auditory message, or take any other action.

Various embodiments of vision-assist devices and methods of detecting the classification of an object are described in detail herein.

Figure 1:
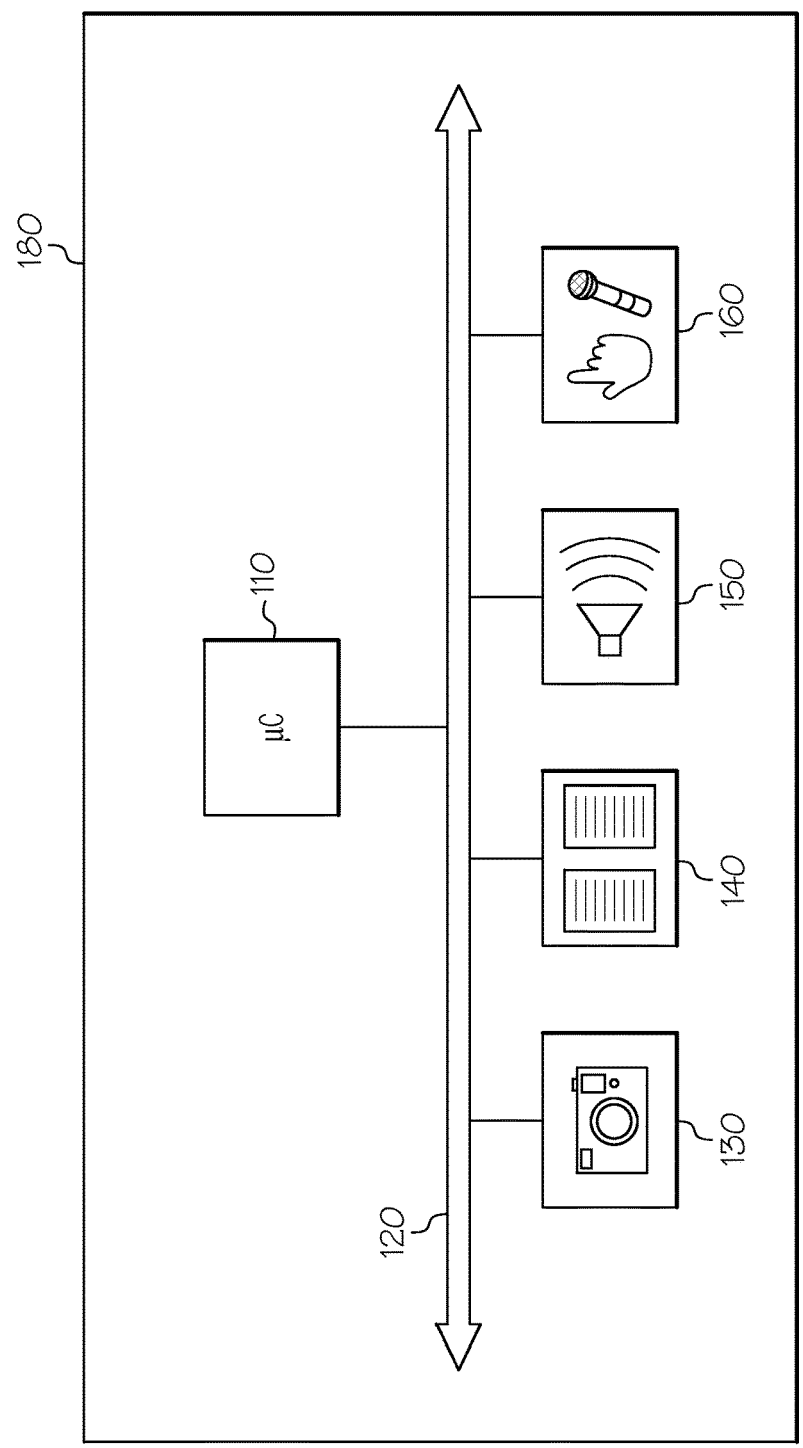
FIG. 1 schematically depicts a vision-assist device according to one or more embodiments described and illustrated herein.

Referring now to FIG. 1, a vision-assist device 100 is schematically depicted. The vision-assist device comprises a housing 180 in or on which internal components are disposed, such as one or more processors 110, one or more image sensors 130, one or more memory components 140 storing computer-readable instructions, one or more audio devices 150, and one or more user input devices 160. As described in more detail below, the housing 180 may take on any configuration and, in some embodiments, may be configured to be worn by the user, thereby freeing the user's hands as he or she operates the vision-assist device 100.

The memory component 140 may be configured as volatile and/or nonvolatile non-transitory computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 140 may be configured to store, among other things, operation logic, object recognition logic, and auditory message generation logic, as described in more detail below. The memory component 140 may also store data, such as image data captured by the one or more image sensors or externally acquired image data, for performing the object recognition analysis described hereinbelow.

A local interface 120 is also included in FIG. 1 and may be implemented as a bus or other interface to facilitate communication among the components of the vision-assist device 100. Although not depicted in FIG. 1, the vision-assist device may also include one or more network interface modules, to connect the vision-assist device to a remote computing device or a remote computer network. The network interface module may include any wired or wireless networking hardware, such as a modem, LAN port, wireless fidelity (Wi-Fi) card, WiMax card, mobile communications hardware, and/or other hardware for communicating with other networks and/or devices.

The one or more processors 110 may include any processing component configured to receive information and execute instructions (such as from the memory component 140).

The one or more image sensors 130 are configured to capture image data of the environment (i.e., scene) in which the vision-assist device 100 operates. The image data digitally represents the scene in which the vision-assist device 100 operates, such as objects and people within the scene. The image sensor 130 may be configured as any sensor operable to capture image data, such as, without limitation, a charged-coupled device image sensors or complementary metal-oxide-semiconductor sensors capable of detecting optical radiation having wavelengths in the visual spectrum, for example. The one or more image sensors 130 may be configured to detect optical radiation in wavelengths outside of the visual spectrum, such as wavelengths within the infrared spectrum. In some embodiments, two image sensors 130 are provided to create stereo image data capable of capturing depth information.

The one or more auditory devices 150 may be configured as speakers capable of receiving auditory signals from the processor 110 (either directly or indirectly from other hardware, such as amplifiers, drivers, digital-to-analog converts, and the like) to produce auditory message capable of being heard by the user. In some embodiments, the one or more auditory devices 150 include a first speaker and a second speaker so that the auditory message is provided to the user in stereo.

The one or more user input devices 160 are provided for the user to communicate with the vision-assist device 100. The one or more user input devices 160 may be used by the user to complete tasks such as program preferences or settings, provide commands, and provide feedback to the vision-assist device 100. The one or more user input devices 160 may take on any appropriate form. For example, the one or more user input devices 160 may be configured as a keyboard, buttons, switches, touch-sensitive pads, microphones, and the like. Any appropriate user input device may be utilized.

It should be understood that the vision-assist device 100 may include additional components not illustrated in FIG. 1, such as a power source, voltage regulators, analog-to-digital converters, digital-to-analog converters, drivers, signal conditioning circuits, electromagnetic filtering circuits, and the like.

Figure 2:
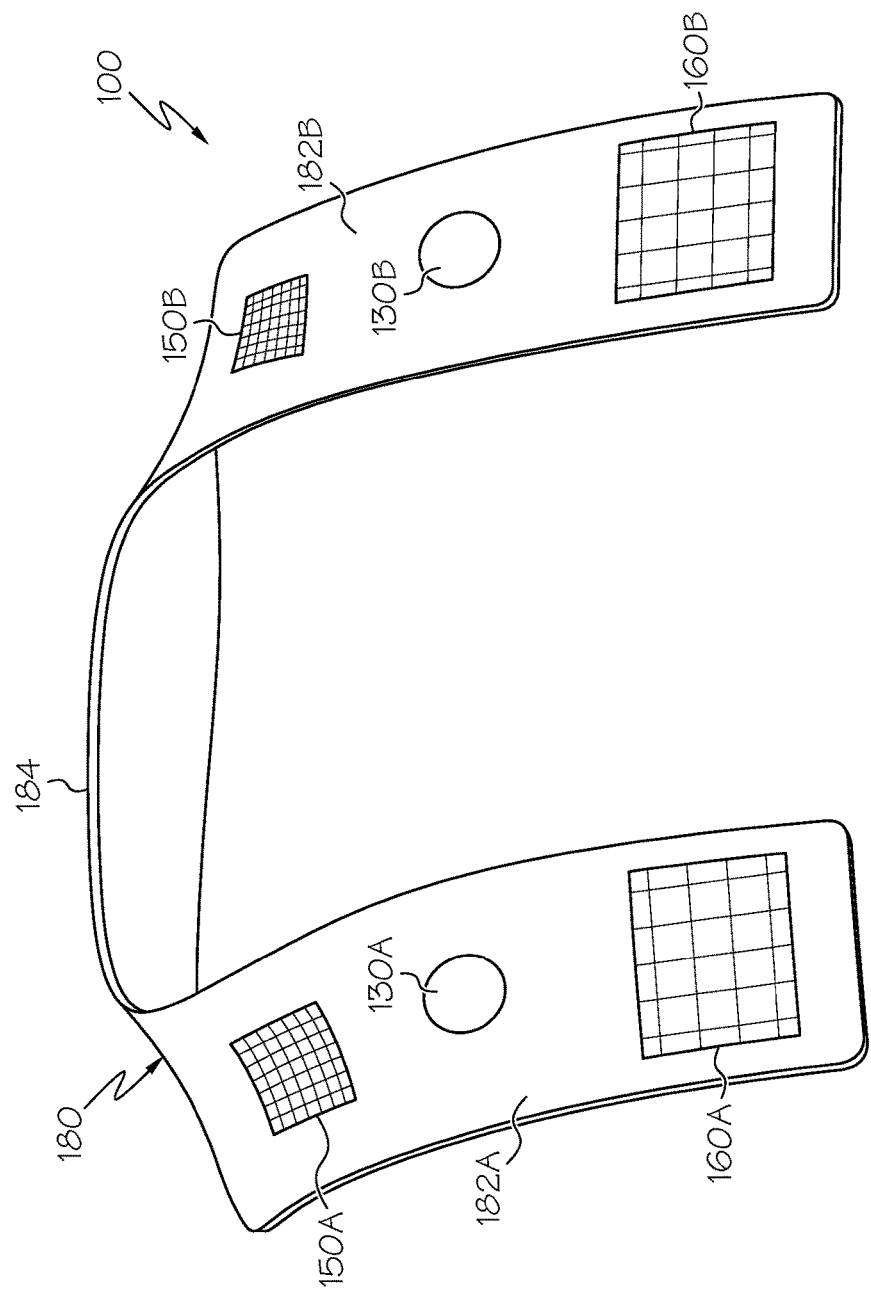
FIG. 2 schematically depicts a vision-assist device configured to be worn around the neck of a user according to one or more embodiments described and illustrated herein.
Figure 3:
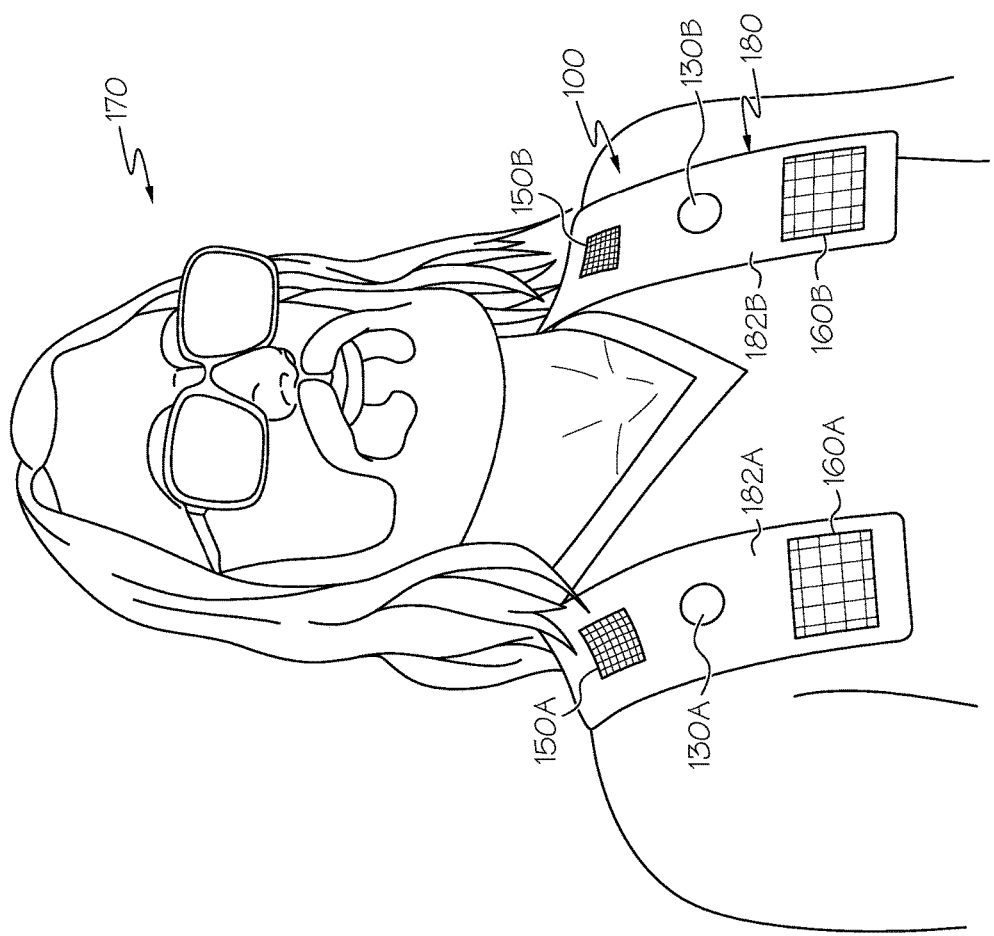
FIG. 3 schematically depicts the vision-assist device of FIG. 2 as worn by a user according to one or more embodiments described and illustrated herein.

Referring now to FIGS. 2 and 3, a non-limiting, example vision assist device 100 is schematically illustrated. FIG. 2 illustrates the example vision-assist device 100 without a user, while FIG. 3 illustrates the example vision-assist device of FIG. 2 worn by a user 170. Referring generally to both FIGS. 2 and 3, the example vision-assist device 100 has a necklace configuration intended to be worn around the neck of the user 170. The housing 180 of the vision-assist device defines a neck portion 184, a first chest portion 182A, and a second chest portion 182B. It should be understood that the housing 180 may be configured differently than what is illustrated in FIGS. 2 and 3, and that the housing 180 may take on different shapes and sizes in other embodiments.

In some embodiments, the housing 180 is made from a pliable material, such as, without limitation, ethylene-vinyl acetate. In other embodiments, the housing 180 is made from a rigid material.

Referring specifically to FIG. 3, the vision-assist device 100 is configured to be worn around the neck of the user 170 such that the neck portion 184 contacts, or is in close proximity to, the back of the user's neck. The first and second chest portions 182A, 182B are draped over the user's chest. In the illustrated example of FIGS. 2 and 3, the first chest portion 182A includes a first audio device 150A, a first image sensor 130A, and a first user input device 160A configured as a touch-sensitive pad or a plurality of mechanical buttons. Similarly, the second chest portion 182B includes a second audio device 150B, a second image sensor 130B, and a first user input device 160B. It should be understood that the arrangement of the various components within the housing 180 of the example vision-assist device 100 depicted in FIGS. 2 and 3 are for illustrative purposes only, and that more or fewer components may be provided, or arranged in a manner that is different from the arrangement depicted in FIGS. 2 and 3. As a non-limiting, alternative arrangement, only one of the first or second chest portions 182A, 182B may include a user-input device, for example. In other embodiments, the first and second audio devices 150A, 150B are not disposed within the housing 180, but rather are configured as headphones worn by the user.

The first and second image sensors 130A, 130B are configured to capture image data to produce three-dimensional images of the scene as the user navigates the environment that are used by the object recognition algorithm(s) to detect objects and people, as described in detail below. As shown in FIG. 3, the first and second image sensors 130A, 130B are disposed with the first and second chest portions 182A, 182B such that they are forward-facing and capture image data of the scene directly in front of the user. In other embodiments, one or more additional image sensors may be disposed within the housing to provide image data in directions other than in front of the user 170, such as to the right, left and/or rear of the user.

The first and second audio devices 150A, 150B produce auditory messages that are intended to be received by the user 170. The auditory messages may provide menu navigation options to the user so that the user may program or otherwise set parameters of the vision-assist device 100. Auditory messages also include environmental information about the scene, as described in detail below. Although two audio devices are illustrated, more or fewer audio devices may be provided. In some embodiments, a microphone is also provided as a user-input device to enable voice-control of the vision-assist device 100. In this manner, the user may provide feedback to the vision assist device 100 using voice commands. As an example and not a limitation, first and/or second audio device 150A, 150B may be configured as a combination speaker/microphone device capable of both receiving voice commands and emitting auditory messages/sounds.

Figure 4:
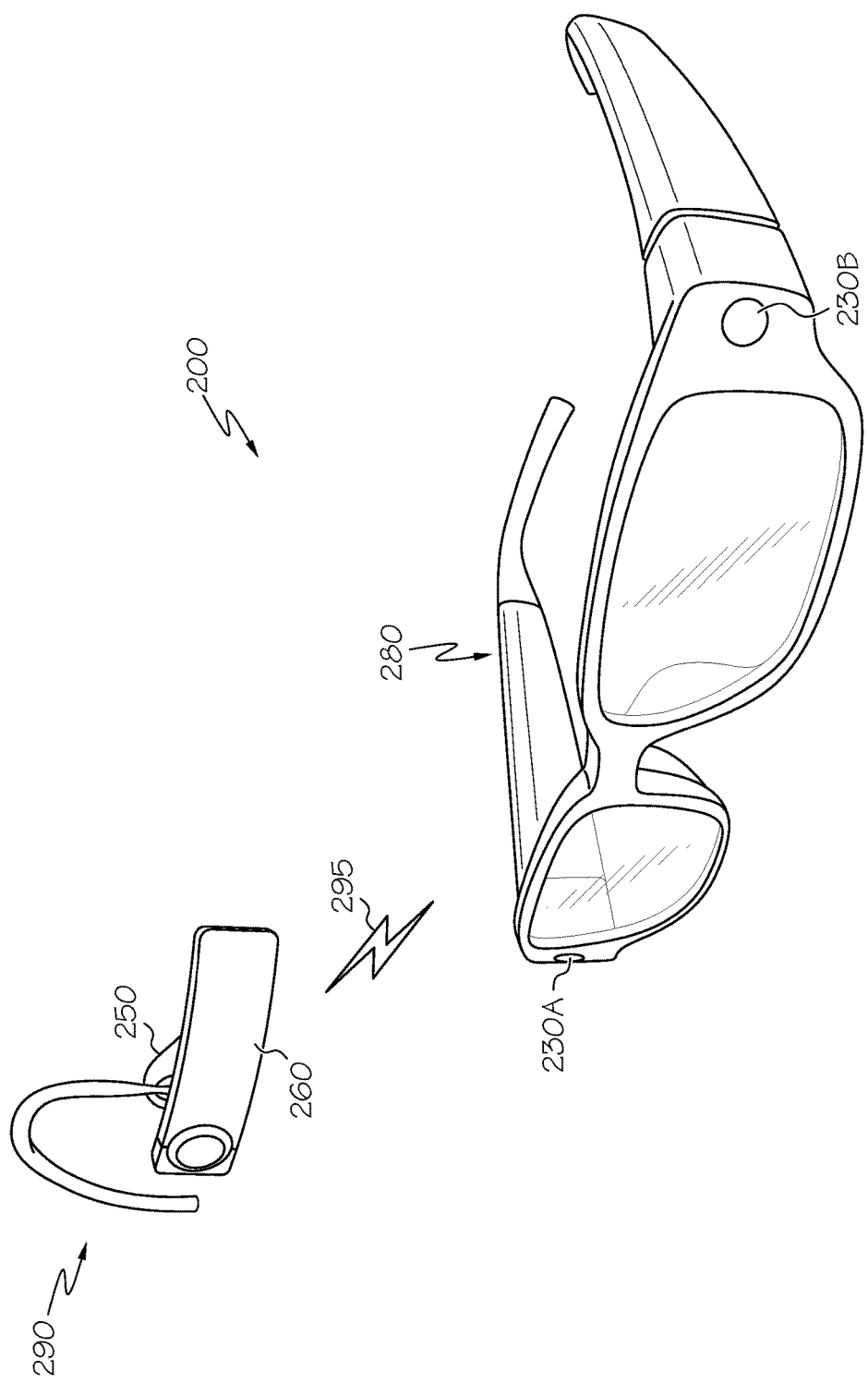
FIG. 4 schematically depicts a vision-assist device configured as eyeglasses according to one or more embodiments described and illustrated herein.

Referring now to FIG. 4, an example vision-assist device 200 configured as eyeglasses is schematically illustrated. In this example, a housing 280 is configured as an eyeglass frame operable to be worn by the user. First and second forward-facing image sensor devices 230A, 230B are disposed on or within respective ends of the housing 280. As stated above, the image sensor devices 230A, 230B are configured as any device capable of capturing image data of a scene. The processor and other hardware (not shown) may be disposed within the housing 280.

The illustrated vision-assist device 200 further includes an earpiece 290 configured to be worn around the ear of a user. The earpiece includes an audio device 250 that is inserted into the user's ear and produces the auditory messages described herein. The example earpiece 290 further includes a microphone 260 as a user input device for inputting information into the vision-assist device 200 (i.e., voice controls). Accordingly, the earpiece 290 acts as an input/output device for the vision-assist device 200. As shown by symbol 295, the earpiece 290 may be in wireless communication with the components (e.g., the processor) within the housing 280. In other embodiments, the earpiece 290 is integrated into the eyeglass frame housing 280.

Figure 5:
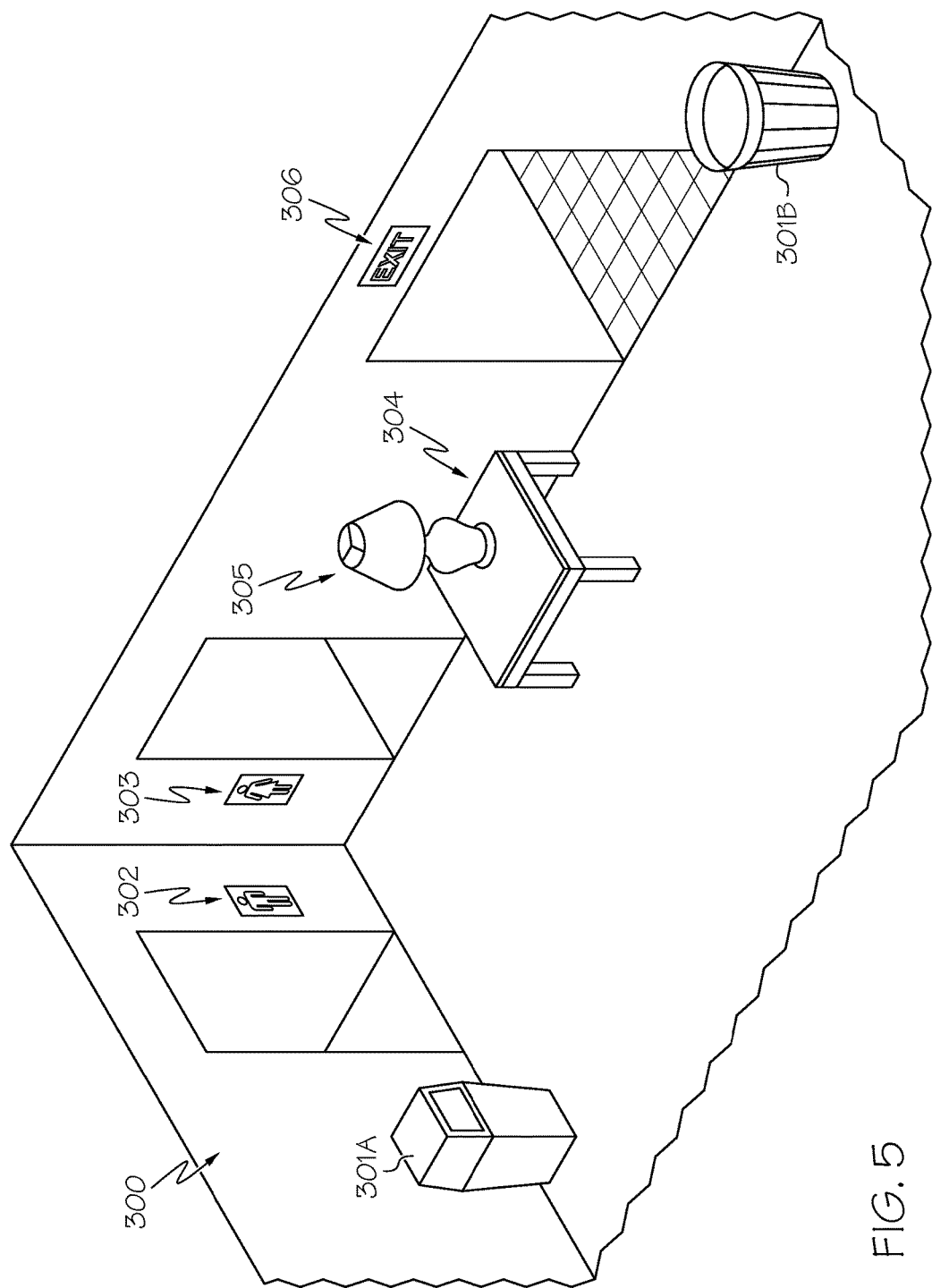
FIG. 5 schematically depicts an environment in which a user may navigate.

Operation of a vision-assist device 100 will now be described. FIG. 5 depicts a scene or environment 300 in which the user may navigate. For example, the environment 300 may be a retail store. Several objects and features are present within the illustrated environment 300, such as a first trashcan 301A, a second trashcan 301B, a men's restroom as indicated by a men's restroom sign 302, a women's restroom as indicated by a woman's restroom sign 303, a table 304, a lamp 305, and an exit as indicated by an exit sign 306. As the user navigates the environment 300, the vision-assist device 100 captures image data and detects objects within the environment.

Figure 6:
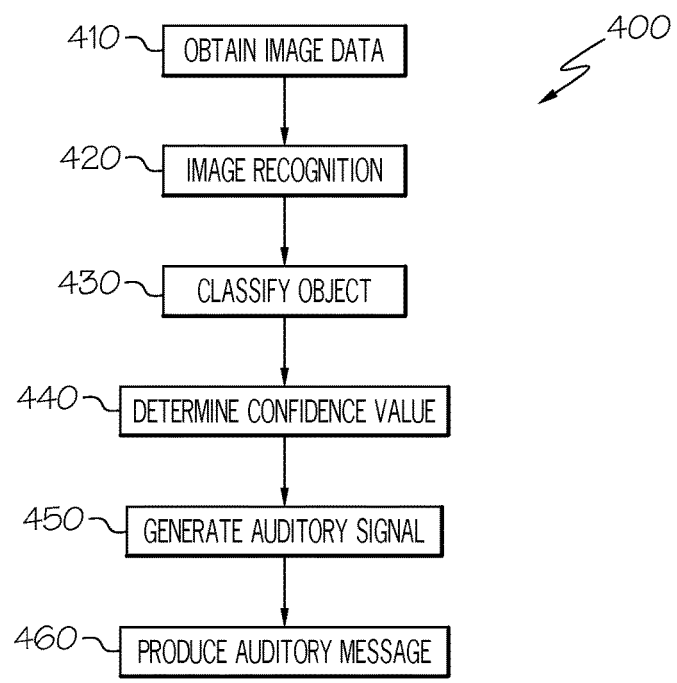
FIG. 6 graphically depicts a process of detecting objects within an environment and providing auditory information regarding detected object according to one or more embodiments described and illustrated herein.

FIG. 6 depicts a process of detecting objects within an environment and providing auditory feedback to the user of a vision-assist device as to objects detected within the environment, such as the environment 300 shown in FIG. 5, for example. As the user navigates the environment 300, the vision-assist device 100 captures image data at block 410 using the one or more image sensors 130. The image data may be in the form of one or more static digital images, or a video made up of many sequential digital images. The image data may be stored in the memory component 140, for example. At block 420, the processor 110 accesses the image data and, in accordance with the object recognition logic, performs one or more object recognition algorithms on the image data. The object recognition logic detects one or more objects within the image data representing the scene.

Any known or yet-to-be-developed object recognition algorithms may be utilized to detect objects within the image data representing the environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like. It should be understood that the phrase "object recognition algorithm" as used herein also includes facial recognition algorithms used to detect people present within image data.

At block 430, the classification of the object is determined as a result of the object recognition process. The classification represents the type of object that is detected. For example, the image data representing the environment 300 shown in FIG. 5 includes a trashcan 301A. The object recognition algorithm may therefore classify object 301A as a trashcan.

Object recognition algorithms are not one hundred percent accurate and may misclassify objects for a variety of reasons. Non-limiting reasons that objects may be classified incorrectly is low ambient light, errors in the image data, the pose of the object in the environment, similarity in shape between different types of objects, and unfamiliarity with the object. Object recognition algorithms of the present disclosure produce a confidence value with respect to the objects that are detected from the image data (block 440). The confidence value represents a degree of confidence regarding whether or not the actual object in the physical environment is the type of object determined from the image data. The confidence value may range from a minimum value (i.e., lowest confidence) to a maximum value (i.e., highest confidence). Low confidence values are produced when the object recognition cannot determine the proper classification of the detected object with high confidence. Conversely, when the object recognition is sure of the classification of the detected object, it produces a high confidence value. In some embodiments, the confidence value is a percentage ranging from 0% as the minimum value to 100% as the maximum value. In other embodiments, the confidence value may not be in the form of a percentage, but rather a number on a predetermined scale (e.g., 0 to 1.0, or 0 to 20).

A user of the vision-assist device 100 should trust the information it provides. If the vision-assist device 100 repeatedly tells the user that objects are something different than the actual objects in the environment, then the user may not wish to use the vision-assist device 100. Embodiments of the present disclosure convert the confidence value produced by the object recognition algorithm(s) into an auditory message capable of being heard and understood by the blind or visually impaired user. The auditory message provides a degree of certainty as to whether or not the classification of the detected object is actually the type of object physically present in the environment. By providing the user with auditory information in such a qualifying manner, the user may decide whether or not to trust the environmental information, and may trust the information provided by the vision-assist device 100 as a whole and may continue to want to use it.

At block 450, the processor 110 generates an auditory signal that includes at least the classification of the detected object as well as a representation of the confidence value for the detected object. An auditory signal, as used herein, is a digital or analog signal produced by the processor (alone or in conjunction with additional circuits or integrated circuits) that is provided to the one or more audio devices 150 (block 460) and represents the auditory message that is emitted by the one or more audio devices 150.

In one embodiment, the auditory signal produced by the processor 110 may be generated by any known or yet-to-be-developed computer speech synthesis processes. In some embodiments, the auditory signal produces an auditory message that is conversational in nature (i.e., in a complete sentence). For example, auditory signal provided to the audio device 150 may state: "I am 40% sure that there is a trashcan in front of you." Accordingly, the auditory message includes both the classification of the object (e.g., "trashcan") and an auditory representation of the confidence value (e.g., "40% sure").

Other types of auditory messages produced by the audio device 150 at block 460 do not recite an actual percentage of confidence but rather qualifies the classification of the object detected by the vision-assist device 100 in other ways. As a non-limiting example, the auditory messages may qualify the classification by use of words and phrases such as "not sure," "I think," "pretty sure," "fairly certain," "positive," "absolutely sure," and the like. For example, the auditory message may state "I think that there is a trashcan in front of you but I am not sure" when the confidence value is very low, and "I am absolutely sure that there is a trashcan is in front of you" when the confidence value is very high. With this type of qualifying information, the user of the vision-assist device 100 may decide whether or not to trust the information, and may use it to determine how he or she may respond (e.g., disregard the information, get a closer look, etc.).

Figure 7:
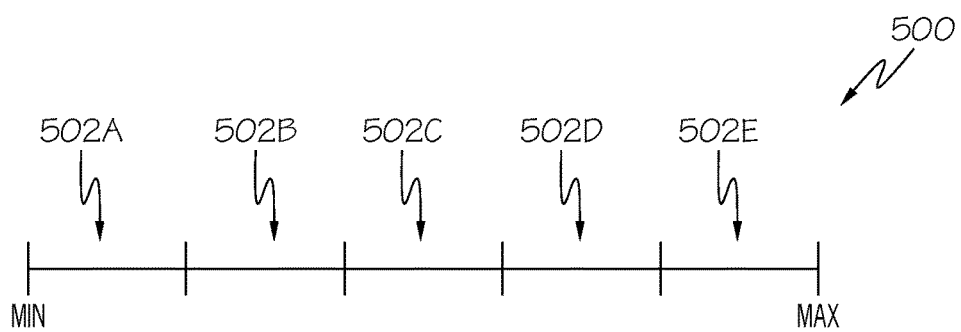
FIG. 7 graphically depicts a confidence value range according to one or more embodiments described and illustrated herein.

A non-limiting method of selecting conversional qualifying phrases for the confidence of the auditory message will now be described. Referring to FIG. 7, the confidence value may be selected from a confidence value range 500 ranging from a minimum confidence value (e.g., 0) to a maximum confidence value (e.g., 100). The confidence value range is sub-divided into a plurality of sub-increments 502A-502E. Any number of sub-increments may be provided. As an example and not a limitation, confidence values within sub-increment 502A range from 0 to 20, confidence values within sub-increment 502B range from 21 to 40, confidence values within sub-increment 502C range from 41 to 60, confidence values within sub-increment 502D range from 61 to 80, and confidence values within sub-increment 502E range from 81 to 100.

Each sub-increment 502A-502E has one or more auditory descriptions associated therewith. The auditory descriptions are the qualifying statements regarding the confidence value. Auditory descriptions in sub-increment 502A represent less of a degree of certainty with respect to the classification of the detected object than the auditory descriptions in sub-increment 502E. As an example and not a limitation, auditory descriptions associated with sub-increment 502A may include "not sure," and "I think," and auditory descriptions associate with sub-increment 502E may include "I am sure," and "I am positive," as non-limiting examples. It should be understood that many auditory descriptions are possible.

When generating the auditory signal, the sub-increment associated with confidence value of the classification of the particular detected object is determined. Using the example from above, if the object recognition algorithm has detected object 301A in FIG. 5 as a trashcan with a confidence value of 74, then sub-increment 502D is selected. The processor 110 generates the auditory signal by including the classification of the detected object (e.g., trashcan) with one or more auditory descriptions associated with sub-increment 502D (e.g., "I am pretty sure," or "I am fairly certain"). An example auditory signal may produce an auditory message that says: "I am fairly certain that there is a trashcan in front of you."

The processor 110 may also incorporate directional information into the auditory message, such as how many degrees to left and right, for example. Distance information may also be provided (e.g., "I am fairly certain that there is a trashcan 10 yards away from you and about 30 degrees to your left").

In some embodiments, the vision-assist device 100 may learn the preferences of the user based on user feedback. The vision-assist device 100 may then adjust how and/or what type of auditory information is provided. Additionally, user feedback may be used in storing image data that is used by the object recognition algorithm in classifying detected objects, as described in more detail below.

Figure 8:
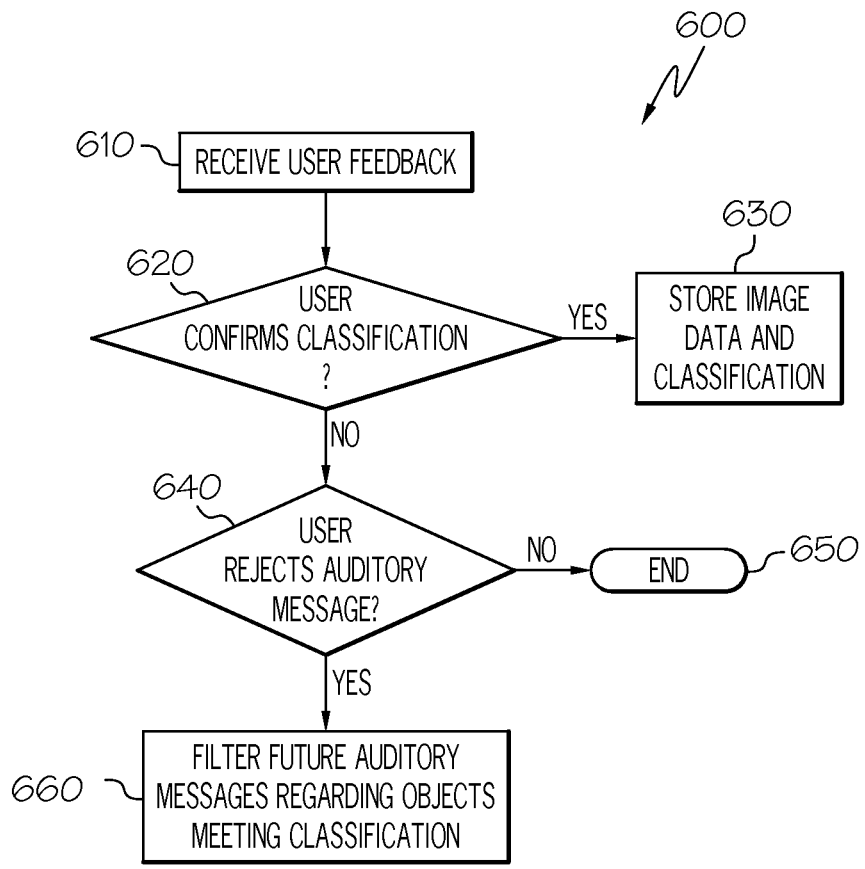
FIG. 8 graphically depicts a flowchart of receiving and acting on user feedback by a vision-assist device according to one or more embodiments described and illustrated herein.

Referring to the flowchart 600 of FIG. 8, the user provides user feedback at block 610. The user feedback may be provided by one or more user input devices 160. For example, the user feedback may indicate that the actual object in the environment was not what the vision-assist device 100 said that it was (i.e., the user rejects the classification provided by the vision-assist device 100), or it may confirm that the actual object in the environment matches what the vision-assist device 100 said that it was. If the user feedback is indicative of confirming the classification at block 620, the process moves to block 630, where the image data of the detected object and its classification are stored in a database. Alternatively, attributes of the detected object and its classification may be stored rather than actual image data. Such information may be utilized by the object recognition algorithm(s) in detecting future objects with increased accuracy.

However, if at block 620 the user feedback does not confirm the classification provided by the vision-assist device 100, the process moves to block 640, where it is evaluated whether or not the user feedback rejects the classification of the detected object provided by the vision-assist device 100. If the user feedback does not reject the classification provided by the vision-assist device 100 (e.g., the user feedback is unrelated to classification of objects), the process ends at block 650, where perhaps some other action is taken. If the user feedback does in fact reject the classification provided by the vision-assist device 100 (either the user indicates he is going to ignore the auditory message or he says it is an object that is different from what the vision-assist device 100 said that it was), then the process moves to block 660 where auditory messages are filtered or altered. For example, the vision-assist device may have indicated that it is 40% sure that detected object is a trashcan. If the user rejects the information, the vision-assist device may then not provide any more auditory messages to the user where the vision-assist device 100 is less than 40% sure that the object is a trashcan.

In other scenarios, if the user feedback indicates that the target object had a classification different than what the vision-assist device 100 said that it was, the information associated with the rejected classification may be stored and used to improve object recognition in the future.

It should now be understood that embodiments described herein are directed to vision-assist devices for use by blind or visually impaired persons. The vision-assist devices described herein detect objects within the user's environment. The vision-assist devices produce auditory messages regarding the types of objects detected in the environment. Further, the auditory messages include qualifying statements regarding the confidence in which the vision-assist device believes that it is correct with respect to the type of object it has detected. The user may then know how much faith she should place in the information provided by the vision-assist device, thereby increasing the trust that the user has in the vision-assist device.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vision-assist device configured to be worn by a user, comprising:
   at least one image sensor for generating image data corresponding to a scene;
   a processor, wherein the processor is programmed to:
      receive the image data from the at least one image sensor;
      perform object recognition on the image data to determine a classification of a detected object that is present within the scene;
      determine a confidence value with respect to the classification of the detected object, wherein the confidence value is based on a confidence that the classification of the detected object matches an actual classification of the detected object; and
      generate an auditory signal based on the confidence value; and
   an audio device for receiving the auditory signal from the processor and for producing an auditory speech message configured to be heard by the user from the auditory signal, wherein the auditory speech message is indicative of the classification of the detected object and a qualifying statement associated with a sub-increment comprising the confidence value.

2. The vision-assist device of claim 1, wherein:
   the confidence value is a percentage based on the confidence that the classification of the detected object matches the actual classification of the detected object; and
   the auditory speech message includes the percentage of the confidence value.

3. The vision-assist device of claim 1, wherein:
   the confidence value is selected from a confidence value range that ranges from a minimum confidence value to a maximum confidence value on a confidence value scale;
   the confidence value range includes a plurality of sub-increments from the minimum confidence value to the maximum confidence value, each sub-increment of the plurality of sub-increments spanning a plurality of confidence values on the confidence value scale;
   each sub-increment of the plurality of sub-increments is associated with an auditory speech description representing a degree of confidence; and
   the auditory signal is generated by selecting a selected sub-increment of the plurality of sub-increments that includes the selected confidence value, and incorporating the auditory speech description associated with the selected sub-increment into the auditory signal such that the auditory speech message comprises an audible speech message to the user of the auditory description associated with the selected sub-increment.

4. The vision-assist device of claim 3, wherein the processor is further programmed to:
   receive a user feedback signal in response to the auditory speech message; and
   adjust the plurality of sub-increments of the confidence value range based on the user feedback signal.

5. The vision-assist device of claim 1, wherein the at least one image sensor comprises a first image sensor and a second image sensor.

6. The vision-assist device of claim 1, further comprising an eyeglass frame, wherein the at least one image sensor is coupled to the eyeglass frame.

7. The vision-assist device of claim 6, further comprising an earpiece configured to be inserted in an ear of the user, wherein the audio device is disposed within the earpiece.

8. The vision-assist device of claim 6, wherein the processor is disposed within the eyeglass frame.

9. The vision-assist device of claim 1, further comprising a housing, wherein the housing comprises a neck portion, a first chest portion, and a second chest portion.

10. The vision-assist device of claim 9, wherein the at least one image sensor is disposed within the first chest portion and/or the second chest portion.

11. The vision-assist device of claim 1, wherein the processor is further programmed to:
   receive a user feedback signal in response to the auditory speech message, the user feedback signal corresponding to the user disregarding the auditory speech message associated with the detected object; and
   for each future detected object having a same classification as the classification of the detected object associated with the user feedback signal disregarding the auditory speech message, generate an auditory signal only when a confidence value is greater than the confidence value associated with the auditory speech message that was disregarded.

12. The vision-assist device of claim 1, wherein the processor is further programmed to:
   receive a user feedback signal in response to the auditory speech message, the user feedback signal corresponding to the user confirming that the classification of the detected object associated with the auditory speech message is the actual classification of the detected object; and
   in response to receiving the user feedback signal, store, in a non-transitory computer-readable medium, the image data representing the detected object and the classification.

13. A method of detecting a classification of an object comprising:
   receiving image data of a scene from at least one image sensor configured to be worn by a user;
   determining from the image data, by a processor, a classification of a detected object that is present within the scene;

determining a confidence value with respect to the classification of the detected object, wherein the confidence value is based on a confidence that the classification of the detected object matches an actual classification of the detected object; and producing an auditory speech message configured to be heard by the user that is indicative of the classification of the detected object and a qualifying statement associated with a sub-increment comprising the confidence value.

14. The method of claim 13, wherein:
the confidence value is a percentage based on the confidence that the classification of the detected object matches the actual classification of the detected object; and
the auditory speech message includes the percentage of the confidence value.

15. The method of claim 13, wherein:
the confidence value is selected from a confidence value range that ranges from a minimum confidence value to a maximum confidence value on a confidence value scale;
the confidence value range includes a plurality of sub-increments from the minimum confidence value to the maximum confidence value, each sub-increment of the plurality of sub-increments spanning a plurality of confidence values on the confidence value scale;
each sub-increment of the plurality of sub-increments is associated with an auditory description; and
the method further comprises selecting a selected sub-increment of the plurality of sub-increments that includes the selected confidence value; and
the auditory speech message includes the auditory description associated with the selected sub-increment.

16. The method of claim 15, further comprising:
receiving a user feedback signal in response to the auditory speech message; and
adjusting the plurality of sub-increments of the confidence value range based on the user feedback signal.

17. The method of claim 13, further comprising:
receiving a user feedback signal in response to the auditory speech message, the user feedback signal corresponding to the user disregarding the auditory speech message associated with the detected object; and
for each future detected object having a same classification as the classification of the detected object associated with the user feedback signal disregarding the auditory speech message, generating an auditory signal only when a confidence value is greater than the confidence value associated with the auditory speech message that was disregarded.

18. The method of claim 13, further comprising:
receiving a user feedback signal in response to the auditory speech message, the user feedback signal corresponding to the user confirming that the classification of the detected object associated with the auditory speech message is the actual classification of the detected object; and
in response to receiving the user feedback signal, storing, in a non-transitory computer-readable medium, the image data representing the detected object and the classification.

19. A vision-assist device configured to be worn by a user, the vision-assist device comprising:
at least one image sensor for generating image data corresponding to a scene;
a processor, wherein the processor is programmed to:
receive the image data from the at least one image sensor;
perform object recognition on the image data to determine a classification of a detected object that is present within the scene;
determine a confidence value with respect to the classification of the detected object, wherein the confidence value is based on a confidence that the classification of the detected object matches an actual classification of the detected object and the confidence value is selected from a confidence value range on a confidence value scale including a plurality of sub-increments respectively spanning a plurality of confidence values on the confidence value scale and respectively associated with an audio speech description comprising a qualifying statement; and
generate an auditory signal based on the confidence value and a sub-increment comprising the confidence value; and
an audio device for receiving the auditory signal from the processor and for producing an auditory speech message configured to be heard by the user from the auditory signal, wherein the auditory speech message is an audible voice message configured to be heard by the user and is indicative of the classification of the detected object, the confidence value, and the qualifying statement associated with the sub-increment comprising the confidence value;
wherein the processor of the vision-assist device is programmed to store in a memory communicatively coupled to the processor at least one of the classification of the detected object, the confidence value of the detected object, and image data of the detected object based on positive user feedback to the auditory speech message.

20. The vision-assist device of claim 1, wherein the scene is a user-navigable environment surrounding the user, the detected object comprises one of a person and a feature present within the user-navigable environment, and the auditory speech message further comprises distance information indicative of a distance between the user and the detected object.

21. The vision-assist device of claim 20, wherein the feature present within the scene comprises at least one a trashcan, a sign indicative of a location, an item of furniture, and a staircase.

* * * * *